United States Patent
Dieling

(10) Patent No.: US 8,678,772 B2
(45) Date of Patent: Mar. 25, 2014

(54) INTAKE CONE FOR A GAS-TURBINE ENGINE

(75) Inventor: Martina Dieling, Rangsdorf (DE)

(73) Assignee: Rolls-Royce Deutschland Ltd & Co KG (DE)

(*) Notice: Subject to any disclaimer, the term of this patent is extended or adjusted under 35 U.S.C. 154(b) by 1230 days.

(21) Appl. No.: 12/551,141

(22) Filed: Aug. 31, 2009

(65) Prior Publication Data

US 2010/0051112 A1 Mar. 4, 2010

(30) Foreign Application Priority Data

Sep. 3, 2008 (DE) .......................... 10 2008 045 546

(51) Int. Cl.
*B64C 11/14* (2006.01)
*F02C 7/04* (2006.01)

(52) U.S. Cl.
USPC ....................................................... 416/245 R

(58) Field of Classification Search
USPC ........ 415/244 R, 245 R, 244 A, 218.1, 219.1; 416/218.1, 219.1, 244 R, 245 R, 244 A
See application file for complete search history.

(56) References Cited

U.S. PATENT DOCUMENTS

| | | | | |
|---|---|---|---|---|
| 2,336,256 A | * | 12/1943 | Junger | 416/245 R |
| 2,793,702 A | * | 5/1957 | Cushman | 416/245 R |
| 5,411,224 A | * | 5/1995 | Dearman et al. | 244/53 B |
| 6,416,280 B1 | * | 7/2002 | Forrester et al. | 416/94 |
| 6,447,255 B1 | * | 9/2002 | Bagnall et al. | 416/245 R |
| 6,561,763 B2 | | 5/2003 | Breakwell | |
| 7,086,830 B2 | * | 8/2006 | Fitzgerald et al. | 415/115 |
| 2008/0022524 A1 | * | 1/2008 | Schreiber | 29/889.21 |
| 2009/0214354 A1 | * | 8/2009 | Bagnall | 416/245 R |

FOREIGN PATENT DOCUMENTS

| | | | |
|---|---|---|---|
| DE | 60200255 | 8/2004 | |
| DE | 69930711 | 8/2006 | |
| DE | 102005013421 | 9/2006 | |
| DE | 102005013421 A1 * | 9/2006 | F02C 7/04 |
| DE | 102006011513 | 9/2007 | |
| DE | 102008011513 | 9/2007 | |
| GB | 2363170 | 12/2001 | |
| GB | 2363170 A * | 12/2001 | F02C 7/04 |

OTHER PUBLICATIONS

Translation of DE 10 2005 013421.*
German Search Report dated Feb. 16, 2012 from counterpart German patent application.
European Search Report dated Jan. 24, 2013 for counterpart European Patent Application.

* cited by examiner

*Primary Examiner* — Nathaniel Wiehe
*Assistant Examiner* — Ryan Ellis
(74) *Attorney, Agent, or Firm* — Timothy J. Klima; Shuttleworth & Ingersoll, PLC

(57) ABSTRACT

An intake cone for a gas-turbine engine has an essentially conical body 5 located on a retaining ring 3 connected to a fan rotor disk, with the body 5 being designed as one piece over its axial length and connected at a conical locating area to a rigidly designed conical supporting area borne on a fan rotor disk.

13 Claims, 5 Drawing Sheets

INTAKE CONE FOR A GAS-TURBINE ENGINE

This application claims priority to German Patent Application DE102008045546.6 filed Sep. 3, 2008, the entirety of which is incorporated by reference herein.

This invention relates to an intake cone for a gas-turbine engine, in particular a turbofan gas-turbine engine, which includes a conical part (conical connection) attached to a retaining ring of the fan rotor and a conical fairing adjoining the conical part. The arrangement of an intake cone on the inlet side of a gas-turbine engine is generally known. Such mostly tapered intake cones are intended on the one hand to provide a swirl-free inflow into the engine, as far as possible, and on the other hand to limit damage by impinging foreign objects (bird strike).

A broad aspect of the present invention is to provide an intake cone of the type specified above, which, while reducing weight and keeping production and assembly effort low, ensures safe attachment and trouble-free operation.

According to the present invention, a gas-turbine engine intake cone is therefore provided which is designable and locatable in an optimized way.

According to the present invention, location is made by a conical locating area which provides for optimum centering. The intake cone, therefore, is stably and safely connected to a fan rotor disk or a retaining ring attached to the latter.

The design according to the present invention enables the entire intake cone to be simply and effectively balanced in the installed state.

Assembly has also been significantly facilitated in accordance with the present invention.

The design according to the present invention provides for relatively constant and small wall thicknesses and enables automated manufacturing, for example by a winding process.

In accordance with the present invention, it is particularly favorable that the connection between the locating area of the intake cone and the supporting area, or the bearing surface of the retaining ring is made by use of bolts, whose axes are essentially vertical to the circumferential surface of the locating area of the intake cone. Provision is thus made for an optimized transmission of forces and an especially safe attachment, additionally contributing to the stable, centered position of the intake cone, in particular since the conical inner surface (locating area) of the latter is parallel to the outer conical surface of the intake cone.

The design according to the present invention furthermore enables the fasteners (bolts) to be recessed relative to the outer surface of the intake cone. This provides for aerodynamic optimization and avoids icing.

For simplified assembly and centering of the intake cone, it can be favorable to provide dowel pins to prevent tilting during assembly, enabling the intake cone to be held and centered relative to the retaining ring before the bolts (fasteners) are fitted and installed.

Centering of the intake cone can here be accomplished, for example, via three such locating pins or dowel pins having small circumferential tolerance. This minimizes the angular deviation. According to the present invention, the conical locating surface provides for further optimization and centering of the intake cone.

In accordance with the present invention, provision is made for particularly favorable balancing of the intake cone. For this, balancing weights can be used which are fitted to the fasteners/bolts. This enables the intake cone to be balanced from the outside without having to be removed. Reproducibility of the axial length of the intake cone is therefore not required.

Furthermore, it is particularly advantageous according to the present invention that the use of bolts as fasteners, or the tolerancing of the fasteners, also enables differences in the axial positioning of the components relative to each other, for example component tolerances, as well as thermal expansion, to be accounted for.

The intake cone according to the present invention is characterized by a variety of merits. The one-piece configuration of the intake cone and its producibility in fiber compound material provides for stability and low weight. The design according to the present invention provides for optimized locatability, with essentially no differences in wall thickness existing, in particular not in the restraining area. Rather, the latter has essentially constant wall cross-section, or essentially constant wall thickness, enabling the intake cone to be subjected to non-destructive material testing.

According to the present invention, provision is further made for improving the design of the bushes and ensuring optimized centering of the intake cone.

The present invention is more fully described in light of the accompanying drawing showing preferred embodiments. In the drawing, FIG. 1 is a simplified schematic representation of a turbofan gas-turbine engine with an intake cone assigned to the fan, FIG. 2 is a partial sectional view in the axial direction of a first exemplary embodiment of the present invention, FIGS. 3 to 5 are enlarged representations of the locating areas according to the embodiment of FIG. 2, FIG. 6 is an enlarged partial view of the representation as per FIG. 5, FIG. 7 is a representation of the conical supporting surface, offset by an angular range to the representations of FIGS. 3 to 6, FIG. 8 is an alternative configuration of the arrangement of the dowel pins, and FIG. 9 is a frontal view of the retaining ring according to the present invention.

The turbofan gas-turbine engine shown in FIG. 1 includes a fan rotor 2 having fan blades 4 disposed on a fan disk and being arranged in a fan casing 1 and driven by the low-pressure turbine via the low pressure shaft, with a one-piece intake cone 5 on the retaining ring 3 being also depicted. The intake cone 5, by virtue of its smooth, conical design, firstly provides for a swirl-free supply of air to the fan rotor 2. The intake cone 5, which, for example, is produced from fiber compound material in a mechanized winding process (see Specification DE 10 2006 011 513 A1), is designed and attached such that the forces exerted to it in the event of a bird strike are axially dissipated via the retaining ring 3. Furthermore, a bird striking the intake cone 5 is flung to the outside by the rotation of the intake cone, i.e. away from the downstream low-pressure compressor.

FIG. 2 shows a partial sectional view of a first exemplary embodiment of the intake cone 5 which can be equipped with a cone tip 6. The intake cone 5 has an essentially constant wall thickness and is made to a method according to Specification DE 10 2006 011 513 A1, for example. The intake cone can alternatively be constructed of a titanium alloy, prepreg, an aluminum alloy, or a one-piece interlace wound of mutually crossing and covering winding layers of alternately adjacent and parallel glass fiber strands and carbon fiber strands of equal thickness, which are embedded in a resin.

At its rearward end, the intake cone 5 is located at a retaining 3 on a conical support providing for centering and axial retention. The connection of the intake cone 5 to the retaining ring 3 neither provides for a vertical seating surface nor for radial centering. Attachment is made by attaching bolts 7 whose heads are each sunk in a recess 10, resulting in a smooth exterior surface. A cup-type insert 11 protects the recesses for the attaching bolts 7.

The retaining ring 3 has a centering element 12. During assembly, centering is made by use of a dowel pin 8 (FIGS. 5 and 6). The pins can be disposed axially or angled. Representation of the centering element 12 has been dispensed with in FIG. 9.

FIGS. 3 to 5 show further details of the present invention. The attaching bolts 7 are arranged such that their axes 13 extend essentially vertically to the conical outer surface of the intake cone 5. The heads 14 of the bolts 7 are each arranged in the recess 10 such that they do not protrude beyond the outer contour of the intake cone 5. The inserts 11 are cup-type and provided with a rim resting on, but not protruding beyond, the outer surface of the intake cone 5. Thus, safe transmission of forces is ensured via the full material thickness of the intake cone.

The retaining ring 3 has reinforced and/or rigid locating surfaces 15 on which the intake cone 5 rests, as shown in FIGS. 3 and 4, in particular. The threading of the bolt 7 engages a nut element 16. FIG. 5 shows a position rotated around the center axis 17 of the intake cone 5 by a given angular amount such that the arrangement of axial dowel pins 8 is visible (see also FIG. 6). The dowel pins 8 serve as an anti-tilting device.

FIG. 6 shows the arrangement of the dowel pins 8 in enlarged representation. These are each arranged in an axial recess 19 (fit hole) with close tolerance and rest, with a shoulder 20, on an axial seating surface of the intake cone 5. Reference numeral 21 indicates a gap between opposite, adjacent surfaces of the intake cone 5 and the retaining ring 3. Reference numeral 22 indicates a gap between the dowel pin 8 and the axial surface of the retaining ring 3. As shown in FIG. 4, the latter is provided with a centering ring 12 omitted in FIG. 6 for simplicity.

Figure 9:
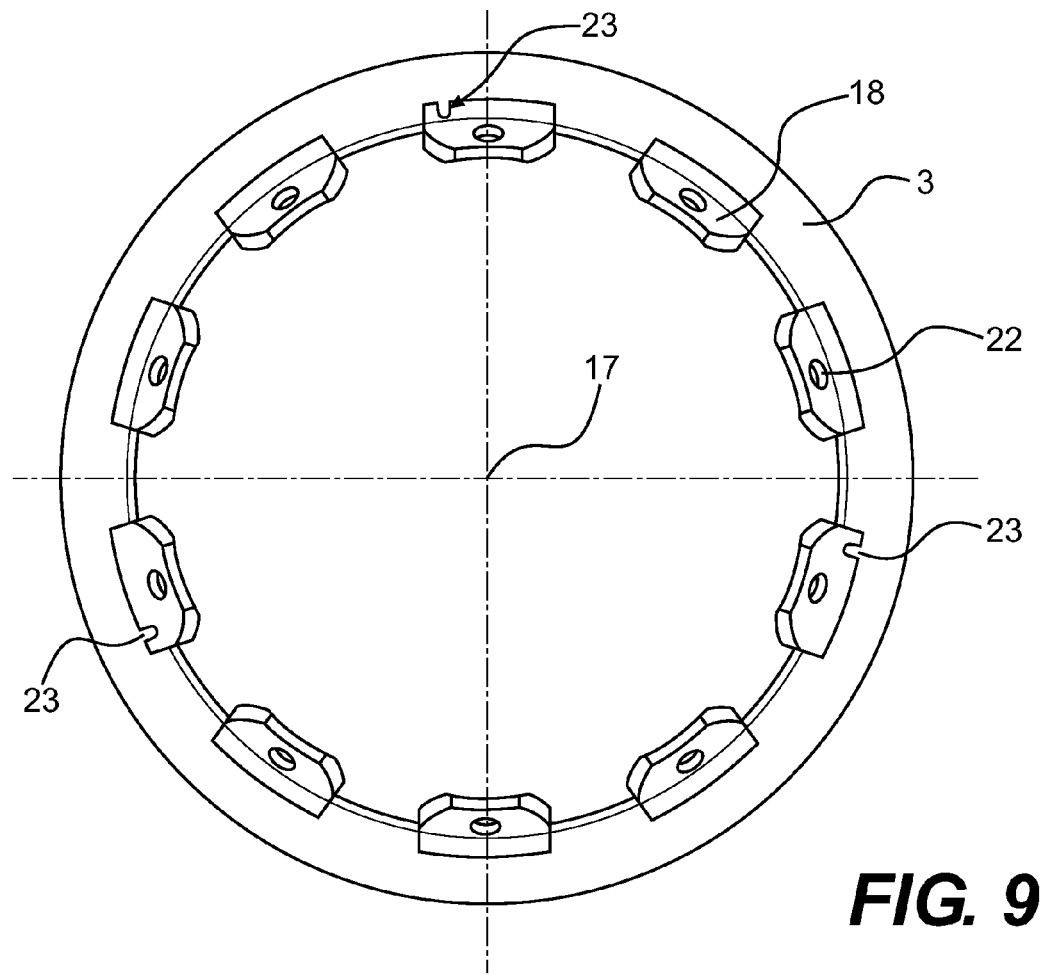
Figure 8:
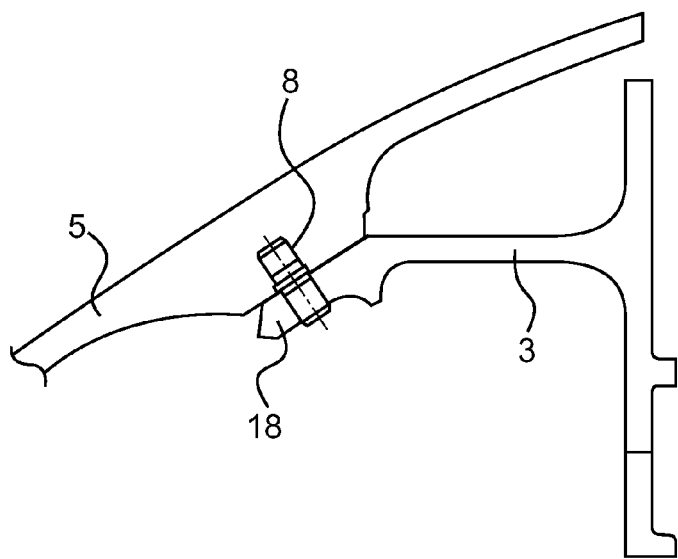
FIG. 8 shows an alternative configuration in which the dowel pins 8 are not arranged axially, but with regard to their axes, essentially vertically to the outer surface of the intake cone 5.

FIG. 9 is a frontal view of the retaining ring 3. The latter has circumferentially spaced individual locating protrusions 18 which are rigidly designed and each provided with a recess 22 through which the attaching bolt 7 can be passed. Also depicted are three circumferentially disposed dowel pins 8, each of which being located in a groove-style recess 23 or a fit hole of the centering ring 12.

According to the present invention, a weight-reduced and production-optimized configuration is provided which is of robust design and suitable for different manufacturing processes of the intake cone. Advantageously, there are few machining surfaces, which further lowers the manufacturing costs.

Figure 1:
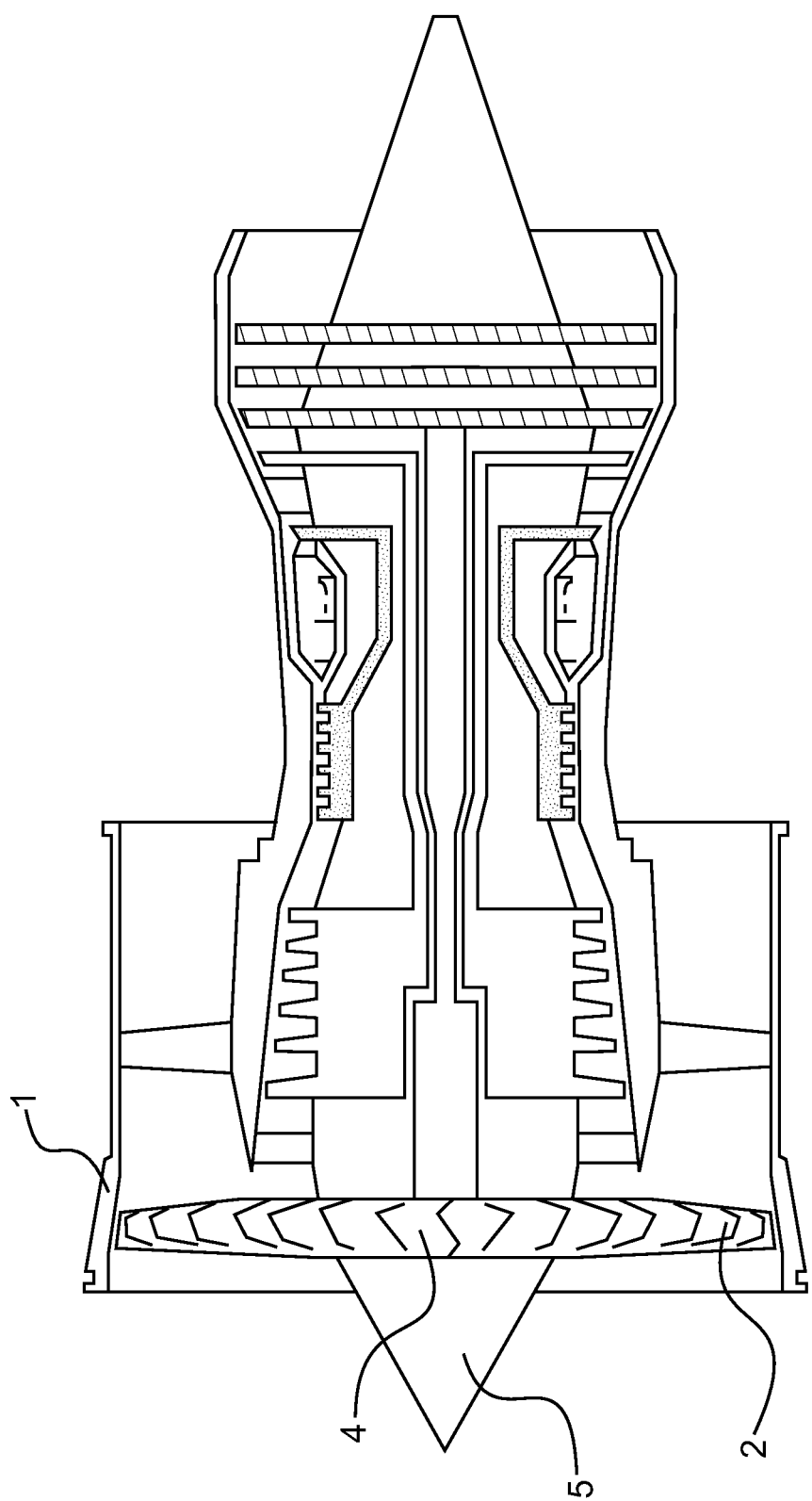
Figure 2:
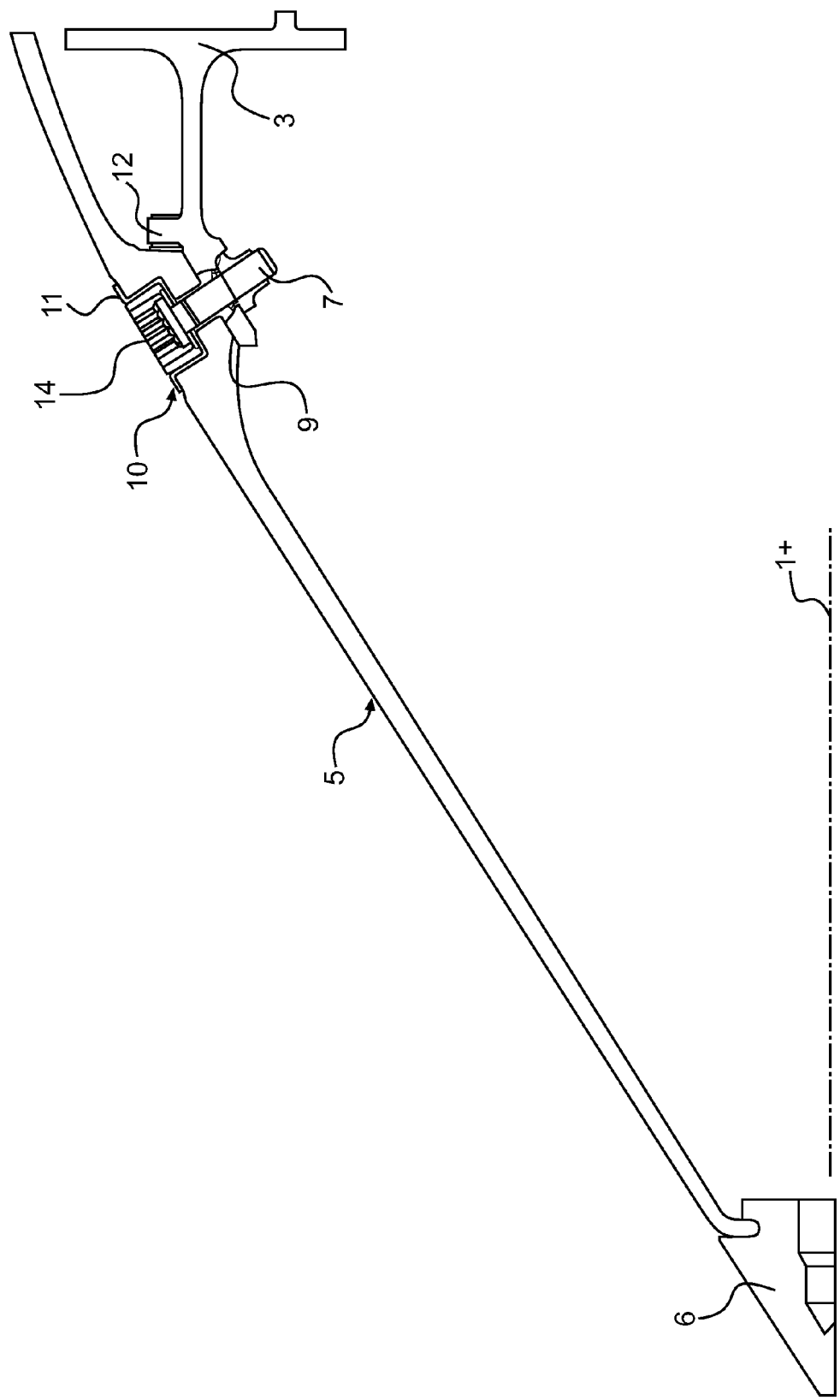
Figure 3:
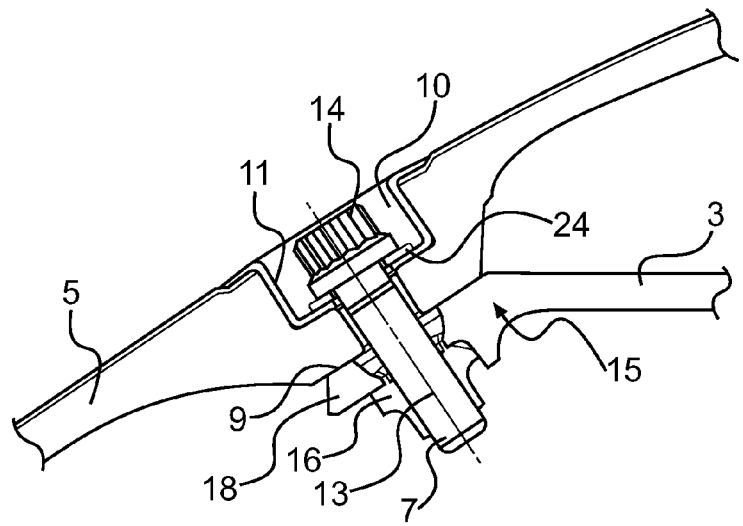
Figure 4:
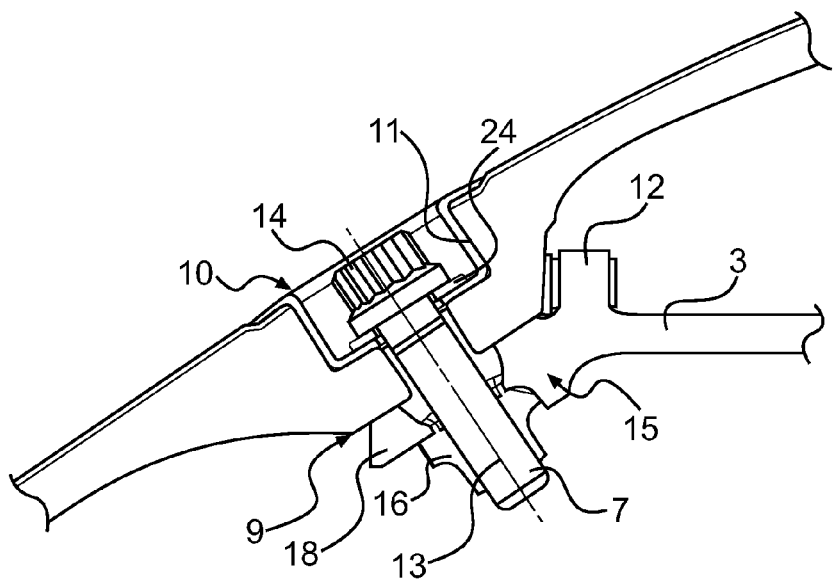
Figure 5:
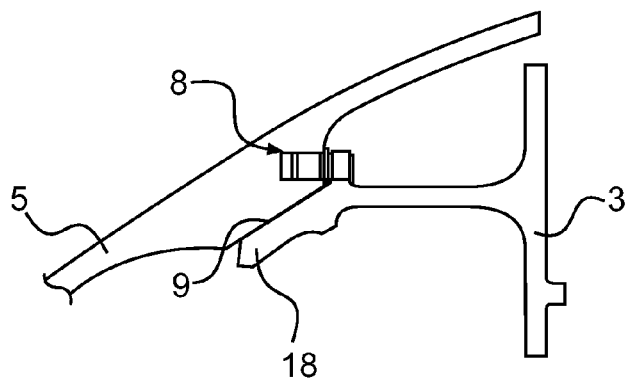
Figure 6:
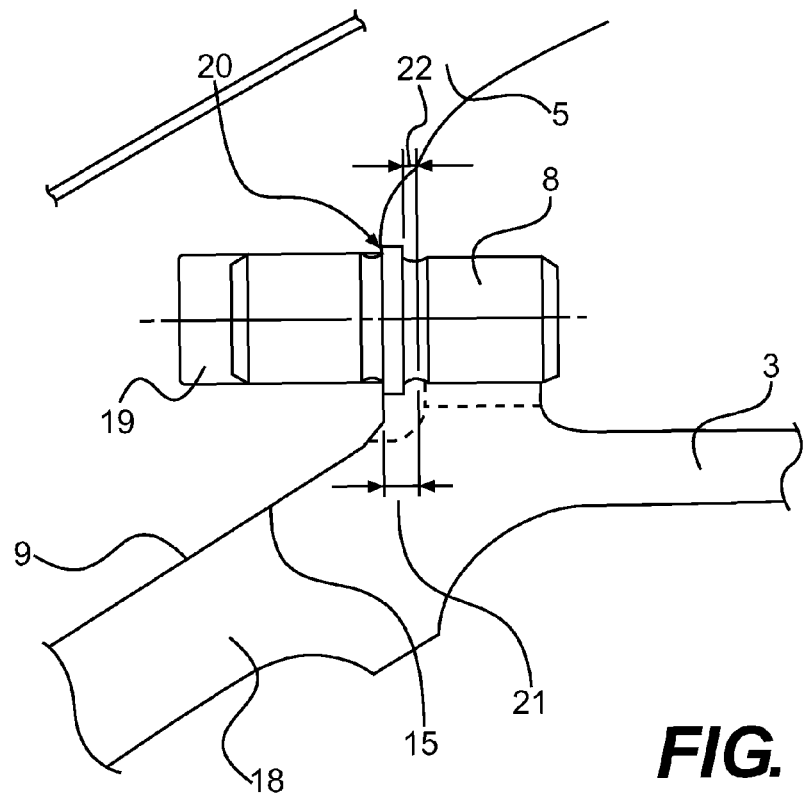
Figure 7:
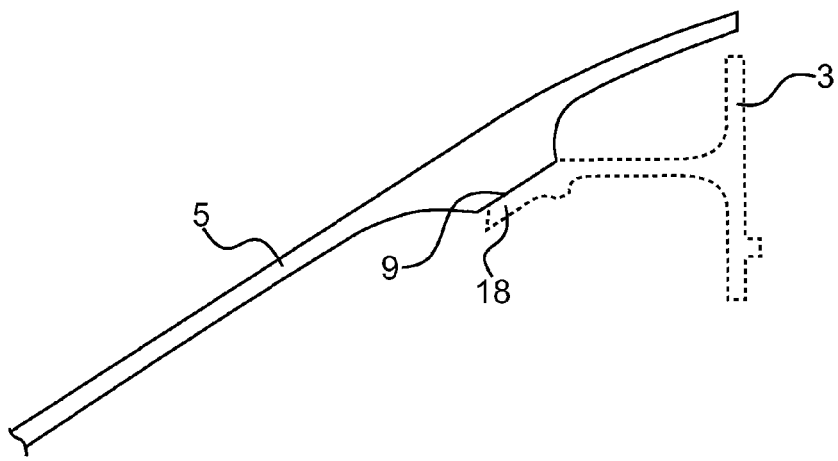
FIG. 7 shows an exemplary embodiment in an arrangement offset by an angular amount, reiterating that the intake cone 5 is located solely on the conical support 9.

Since balancing washers 24 (as balancing weight) can be fitted beneath the bolt head 14 (see FIGS. 3 and 4), balancing is easily, time-savingly and cost-effectively accomplishable without the need to disassemble the intake cone. This also provides for a substantial saving of time during assembly and balancing.

LIST OF REFERENCE NUMERALS

1 Fan casing
2 Fan rotor
3 Retaining ring
4 Fan blade
5 Intake cone/intake cone body
6 Cone tip
7 Attaching bolt
8 Dowel pin
9 Conical support
10 Recess
11 Insert
12 Centering ring
13 Bolt axis
14 Bolt head
15 Locating surface
16 Nut element
17 Center axis
18 Locating protrusion
19 Axial recess/fit hole
20 Shoulder
21 Gap
22, 23 Recess
24 Balancing washer/balancing weight

What is claimed is:

1. An intake cone for a gas-turbine engine, comprising:
an essentially conical body configured as an integral piece over an axial length thereof and including a conical locating area; and
a retaining ring having a conical supporting area and connectable to a fan rotor disk, the conical body positioned on the retaining ring such that the conical locating area of the conical body engages the conical supporting area of the retaining ring to be supported and radially centered by the conical supporting area of the retaining ring, the conical body being supported and radially centered only by the conical supporting area of the retaining ring and axially positioned only through the conical supporting area of the retaining ring.

2. The intake cone of claim 1, wherein the conical locating area is connected to the conical supporting area with a plurality of bolts, whose axes are essentially normal to a circumferential surface of the locating area of the intake cone.

3. The intake cone of claim 2, wherein the conical locating area includes an essentially cylindrical recess for each bolt.

4. The intake cone of claim 1, and further comprising balancing weights fitted in the locating area of the intake cone.

5. The intake cone of claim 1, wherein the intake cone is a one-piece interlace wound of mutually crossing and covering winding layers of alternately adjacent and parallel glass fiber strands and carbon fiber strands of equal thickness, which are embedded in a resin.

6. The intake cone of claim 1, wherein the intake cone is made of a titanium alloy.

7. The intake cone of claim 1, wherein the intake cone is made of prepreg.

8. The intake cone of claim 1, wherein the intake cone is made of an aluminum alloy.

9. The intake cone of claim 1, and further comprising an axial clearance between a radially extending portion of the intake cone and a radially extending portion of the retaining ring.

10. The intake cone of claim 1, wherein the conical locating area includes an essentially cylindrical recess for each bolt.

11. The intake cone of claim 1, wherein the retaining ring includes circumferentially spaced and axially oriented locating protrusions, which are connected to the locating area of the intake cone.

12. The intake cone of claim 11, and further comprising balancing weights fitted in the locating area of the intake cone.

13. An intake cone for a gas-turbine engine, comprising:
an essentially conical body configured as an integral piece over an axial length thereof and including a conical locating area;
a retaining ring having a conical supporting area and connectable to a fan rotor disk, the conical body positioned on the retaining ring such that the conical locating area of the conical body engages the conical supporting area of the retaining ring to be at least partially supported and radially centered by the conical supporting area of the retaining ring;
an anti-tilting device coupling the conical body to the retaining ring in an area of the conical locating area, the anti-tilting device including:
  at least one dowel pin extending axially outwardly from one of the retaining ring and the conical body;
  at least one axial recess positioned in an other of the retaining ring and conical body, the at least one recess constructed and arranged to slidingly engage the at least one dowel pin with a close tolerance;
  an axial gap positioned between a face of the conical body in an area of the dowel pin and an opposing face of the retaining ring in the area of the dowel pin;
  the engagement between the at least one dowel pin and the at least one axial recess preventing rotation and tilting of the conical body with respect to the retaining ring while allowing axial movement between the conical body and the retaining ring within a range of the axial gap.

\* \* \* \* \*